Feb. 6, 1951  F. H. WINSLOW ET AL  2,540,362
FILTER
Filed April 16, 1947  2 Sheets-Sheet 1
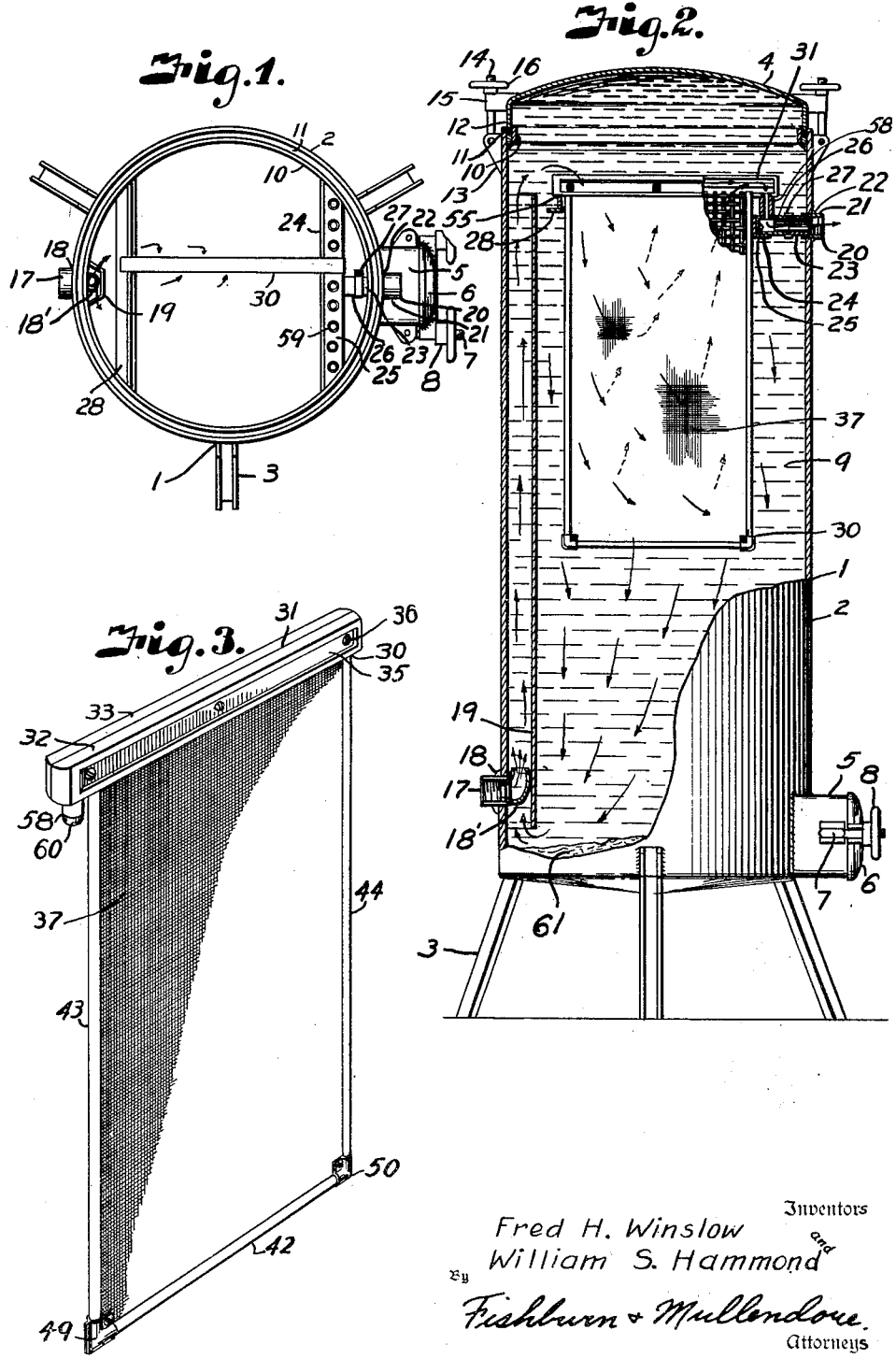
Inventors
Fred H. Winslow
and
William S. Hammond
By
Fishburn & Mullendore
Attorneys

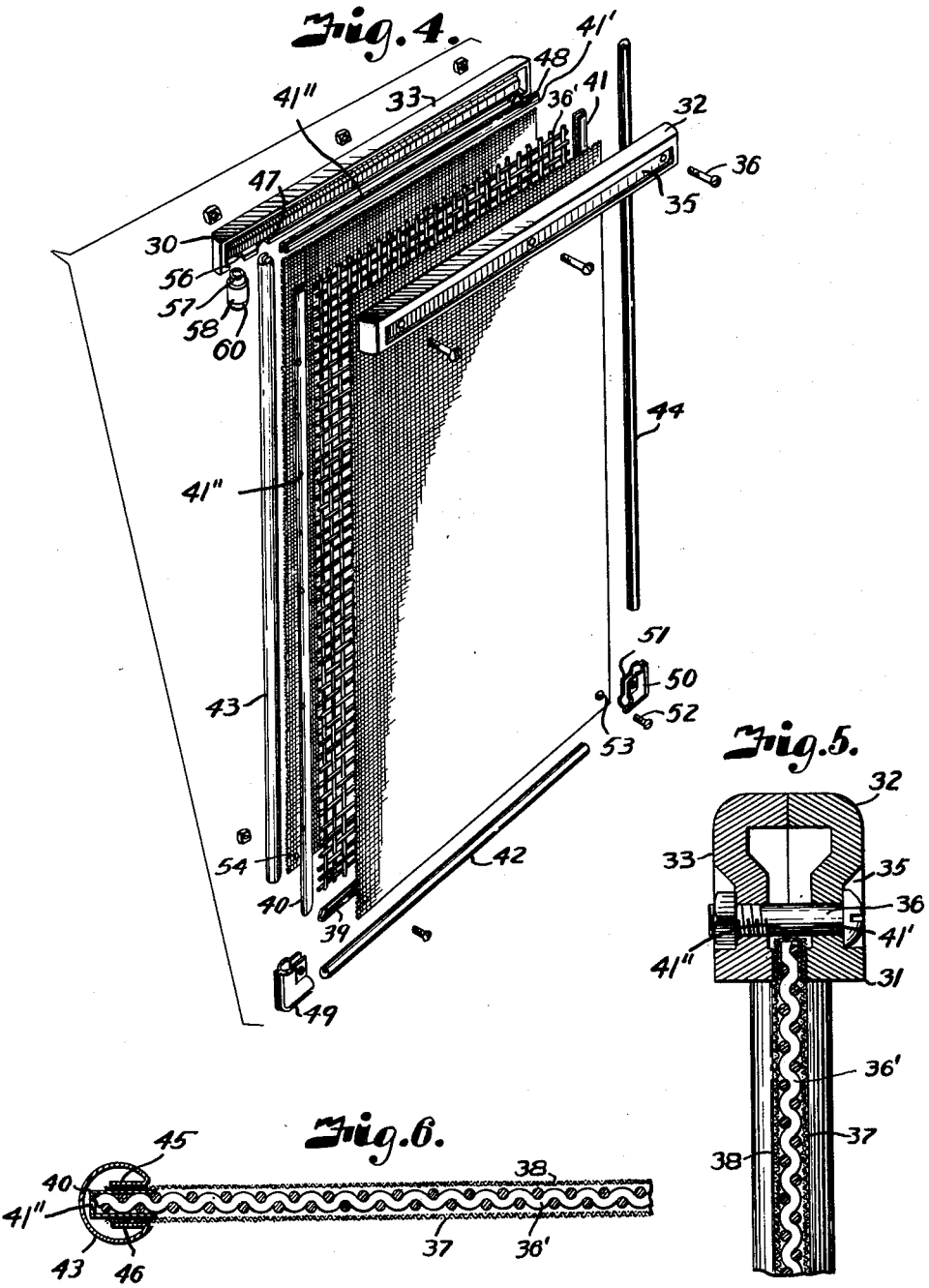

Patented Feb. 6, 1951

2,540,362

UNITED STATES PATENT OFFICE 2,540,362

FILTER

Fred H. Winslow and William S. Hammond,
Waco, Tex.

Application April 16, 1947, Serial No. 741,780

1 Claim. (Cl. 210—181)

This invention relates to filters, and more particularly to pressure filters particularly adaptable for filtering solvents used in the dry cleaning industry.

Filters of this character generally include a pressure tank enclosing a suitable number of filtering elements ordinarily constructed with a core in the form of a heavy wire core on either side of which is placed a fine mesh wire cloth of Monel wire fastened around the edges by soldering or other permanent means. In use of this type of filter the liquid to be filtered is pumped into the tank under pressure and the outlet for the liquid is through the fine mesh wire screen around the core, thence through a discharge manifold usually at the bottom of the tank. With the type of filter above described, it is difficult to clean the screens. When the wire mesh becomes clogged, the wire must be scraped and brushed and washed with a caustic solution and sprayed with steam or air, followed by brushing and drying, and permanent fastening of the screens together precludes disassembly for cleaning.

It is, therefore, the principal objects of the present invention to provide a filtering element for filtering tanks which may be disassembled for cleaning, and replacement of the wire cloth.

Other objects of the invention are to provide a filtering element eliminating the necessity of soldering the parts together; to provide an element which will prevent clogging of the filtering surface; to provide a removable discharge fitting for the filtering element and tank; to provide a filtering element having a discharge manifold arranged near the top of the filtering tank; to provide for supply of solvent to the filter outside the core to prevent bulging of the screen through clogging; to provide a device having little back pressure on the filtering medium; to provide a discharge manifold which may be quickly and easily removed and replaced; and to provide a device of this character simple, economical to manufacture and efficient in operation.

In accomplishing these and other objects of the present invention, we have provided improved details of structure, the preferred form of which is illustrated in the accompanying drawings, wherein:

Fig. 1 is a top plan view of our invention with the top removed.

Fig. 2 is a vertical partly sectional view showing the filtering element in position in the tank.

Fig. 3 is a perspective view of the filtering element with part of the filtering cloth broken away.

Fig. 4 is a perspective view of the filtering element shown in disassembled relation and part of the filtering cloth broken away.

Fig. 5 is a vertical sectional view taken through the filtering element particularly illustrating the header of the filtering element.

Fig. 6 is a sectional view through the screen element particularly illustrating the binders for holding the element together.

Referring more in detail to the drawings:

1 designates a filter embodying the features of our invention comprising a tank 2, here shown to be substantially circular in cross section, having supporting legs 3 and a cover 4. The tank is provided near the bottom with a clean-out spout 5 having a cover 6 secured to the spout by the usual clamping bolt 7 and hand nuts 8 as is conventional practice, the spout being adapted for draining the filtering medium 9 from the tank and also to remove any dirt and foreign material from the bottom of the tank.

Secured to the inner surface of the tank near the top thereof is an annular flange 10 providing an annular recess 11 adapted to receive the downwardly extending flange portions 12 of the cover 4. Located on the outer surface of the tank 2 are ears 13 adapted to pivotally mount fastening bolts 14 adapted to fit into keepers 15 secured to the cover 4 to fasten the cover on the tank by hand nuts 16, also as is conventional practice.

An intake opening is provided in the side of the tank 2 for supply of cleaning fluid to the tank, the intake consisting of a tubular member 17 welded to the tank as indicated at 18 (Fig. 2) to which may be attached a line leading to a source of supply of solvent (not shown). The intake is preferably located near the bottom of the tank 2 substantially level with the top of the clean-out spout 5. An L coupling 18' is attached to the pipe 17 inside the tank to direct the fluid upwardly. Adjacent the lower inner end of the intake and secured to the side of the tank by welding or other suitable means is a baffle 19 also adapted to direct the fluid upwardly as it enters the tank as shown by the arrows in Fig. 2. The baffle is spaced from the bottom of the tank so that circulation will be caused as shown by the arrows under the baffle. A discharge opening is provided in the side of the tank near the top thereof and opposite the intake side of the tank as indicated at 20 (Fig. 2) comprising a short tubing 21 welded or otherwise secured to the discharge opening as indicated at 22. The pipe 21 is adapted to receive a short coupling 23 to which the filtering element is secured as will later be described.

Extending across the tank near one side thereof and welded or otherwise secured to the inner wall of the tank is an angle iron 24 adapted to support a tubular member or manifold 25. The tubular member 25 is provided in the side thereof near the side wall of the tank with an opening adapted to receive a short tubing 26 which is secured to the short tubing 23 by a clamping member 27.

Extending across the inside of the tank and parallel with the tubular member 25 is a bar 28 which may be welded or otherwise suitably secured to the tank, the bar 28 and tubular member 25 providing a support for the filtering element 30. While we have here illustrated one filtering element in the tank, any desired number may be used.

The filtering element comprises a header 31 consisting of parallel members 32 and 33 having longitudinal recesses in their inner mating faces providing a chamber 34 through the header. The outer faces of the members 32 and 33 are recessed as indicated at 35 and provided with a plurality of openings adapted to receive bolts or the like 36 for clamping the members 32 and 33 together.

The filtering element proper comprises a woven wire core 36' here illustrated to be substantially rectangular in shape adapted to be supported between sheets of fine mesh wire cloth 37 and 38 (Fig. 5) commonly known as Monel wire, although other materials may be adaptable for our purpose. U-shaped channel members 39, 40, 41 and 41' are adapted to engage the sides, top and bottom of the woven wire core 36' as best illustrated in Fig. 6. The U-shaped channel members 39, 40, 41 and 41' are provided with a plurality of openings 41'' to allow the fluid medium to pass therethrough into the clamping members 42, 43 and 44 to thus conduct the fluid to the header. The edges of the fine woven wire sheets 37 and 38 are then placed over the channel members and engage the outer sides thereof and are held securely to the channel members by elongated binders or clamping members 42, 43 and 44 which bind the sides and bottom of the filtering element securely together. The clamps 42, 43 and 44 are substantially circular and preferably made of soft sheet metal or similar material having inturned flanges 45 and 46 as best illustrated in Fig. 6 to engage the outer surfaces of the fine mesh wire cloth 37 and 38. The upper ends of the side clamps 43 and 44 fit into recesses 47 and 48 in the members 32 and 33 of the header 31 and the mating faces of the side members provide clamping jaws 48 to clamp the upper edges of the wire core and wire sheets together as best illustrated in Fig. 5. The lower ends of the clamping members 43 and 44 and the ends of the clamping member 42 are held secured together by corner fastening members 49 and 50 having recessed portions adapted to engage the clamping members and having ears 51 provided with openings adapted to receive bolts or the like 52 for securely clamping the corners of the clamping members together. The lower respective corners of the wire sheets and core are provided with openings as indicated at 53 and 54 to accommodate the bolts 52.

The header has its respective ends extending beyond the side edges of the clamping members so that one end rests on the bar 28 as indicated at 55 (Fig. 2). The opposite ends of the parallel members 32 and 33 of the header are provided with recesses 56 adapted to receive the end 57 of a tube 58 and the opposite end of the tube being adapted to seat in an opening 59 in the manifold 25. As illustrated in Fig. 1, we have provided a plurality of beveled openings to accommodate any desired number of filtering elements. The end of the nipple 58 is machined as indicated at 60 in substantially the shape of a section of a sphere to seat in the beveled or spherical openings 59, so that a perfect seat will result even when the nipple meets the header at an angle.

In operation of a filter constructed and assembled as described, filtering medium entering through the intake opening 17 under pressure will act against the baffle 19 and flow upwardly thereover and thence downwardly around the filtering element as shown by the arrows in Figs. 1 and 2. Continued pressure will force the filtering medium through the fine Monel wire mesh sheets 37 and 38 and cause the filtering medium to flow upwardly around the wire core 36' to enter the chamber 34 of the header 31 and be discharged through the tube 58 to the manifold 25, thence to the discharge outlet 22. It will be obvious that all cleaning solvent will thus be forced through the filtering element before it can be discharged from the tank, the baffle 19 serving to prevent the solvent from flowing directly to and between the elements as it enters the tank.

It will further be obvious that the discharge tube 58 rests on the manifold 25 and the opposite end of the header rests on the support bar 28, thus eliminating the necessity for guideways for the filtering elements and providing for easy removal and replacement of the discharge manifold by removal of the clamping ring 27.

It will be obvious that the induced flow due to circulation of the fluid will lessen accumulation of muck, as indicated at 61, in the bottom of the tank. The construction of our filter results in a smooth surface of the Monel wire sheets which lay flatly against the core and the edges are not distorted by heat or pressure as is the soldered or locked sheets as has been done in the past. The actual filtering is done by a coating of fiber or fuller's earth or other filter aid which is pumped into the filter with the flow of solvent and collected on the surface of the Monel wire cloth.

It is important to obtain a smooth surface over the Monel wire for the reason that when a film of filter aid is collected when the elements are under pressure it is immediately thrown off when the circulation is stopped due to the buckling of the distorted surface. When the circulation is again started dirty solvent will immediately flow to this bare spot and these bare spots if they exist will in a short time become sealed with the accumulation of dirt and foreign matter and only the smooth constantly coated surface will be active filtering surface.

It will further be obvious that the filtering element is sealed by binders having clamping action instead of soldering as is the usual practice, which provides a device which may be disassembled for cleaning. It will further be obvious that our assembly of parts will eliminate baggy filtering surfaces resulting from bulges from circulation of the liquid when pressure is applied, the wire core preventing collapse of the fine wire sheets and the sheets preventing foreign matter from filtering therethrough.

What we claim and desire to secure by Letters Patent is:

In a filtering tank of the character described, a filtering element comprising, a header including two parallel clamping members having recessed portions longitudinally thereof providing a chamber through said header, said parallel clamping members forming jaws and having their outer faces recessed, a woven wire core, U-shaped channel members engaging the sides, top and bottom of said core, said U-shaped channel members having a plurality of openings for passage of fluid medium therethrough, sheets of fine mesh screen overlying said core and having their edges engaging the respective sides of said channel members, clamping members engaging the sides and bottom of said screens over said U-shaped members for sealing the respective edges of said screens, said last named clamping members being substantially circular in cross section and having their free ends turned inwardly forming parallel flanges for engaging the edges of said screens, means securing the lower corners of said clamping members together, the jaws of said header engaging the upper edges of said core, screens and clamping members, means engaging in the recesses of said jaws for securing said jaws together, and said header being provided with a discharge opening.

FRED H. WINSLOW.
WILLIAM S. HAMMOND.

REFERENCES CITED

The following references are of record in the file of this patent:

UNITED STATES PATENTS

| Number | Name | Date |
|---|---|---|
| 1,943,811 | Child et al. | Jan. 16, 1934 |
| 2,207,346 | Hopper | July 9, 1940 |
| 2,221,210 | Soderquist | Nov. 12, 1940 |
| 2,359,368 | Klopfenstein | Oct. 3, 1944 |
| 2,443,087 | Ulrich | June 8, 1948 |

FOREIGN PATENTS

| Number | Country | Date |
|---|---|---|
| 122,122 | Germany | July 16, 1901 |